Figure 1:
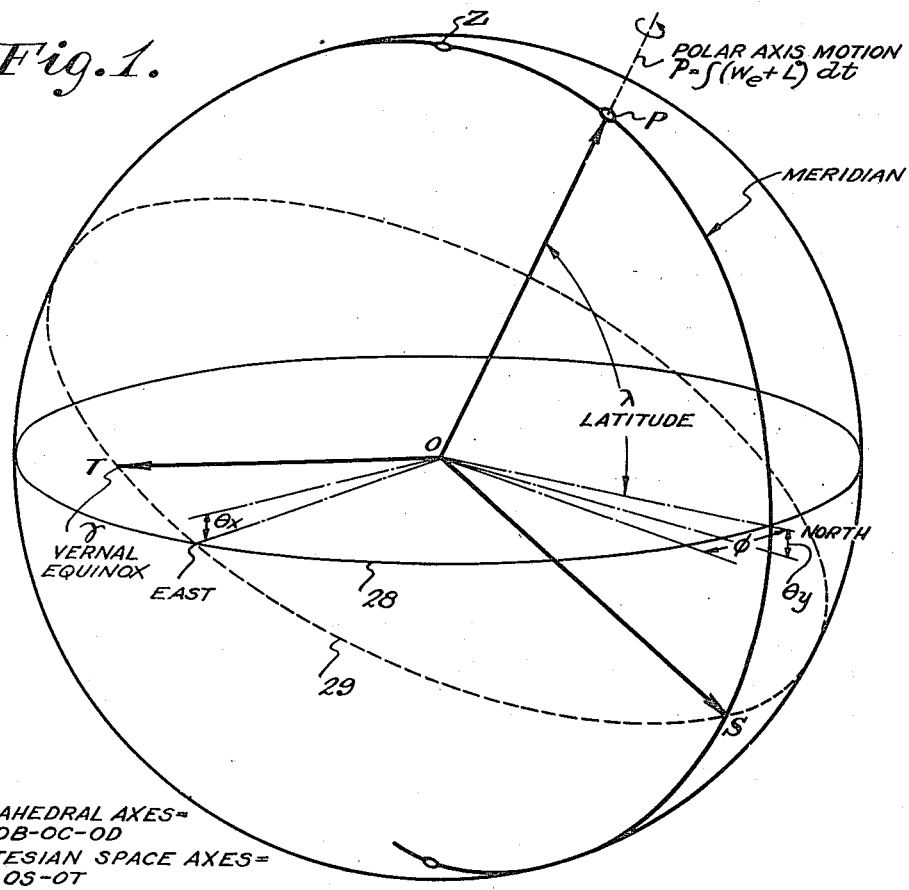

May 20, 1958  V. VACQUIER ET AL  2,835,131
NAVIGATING SYSTEMS FOR DIRIGIBLE CRAFT
Filed Dec. 23, 1952  5 Sheets-Sheet 1

INVENTORS
VICTOR VACQUIER
ROBERT B. BLIZARD
BY
Arthur H. Serrell
ATTORNEY

May 20, 1958  V. VACQUIER ET AL  2,835,131
NAVIGATING SYSTEMS FOR DIRIGIBLE CRAFT
Filed Dec. 23, 1952  5 Sheets-Sheet 5
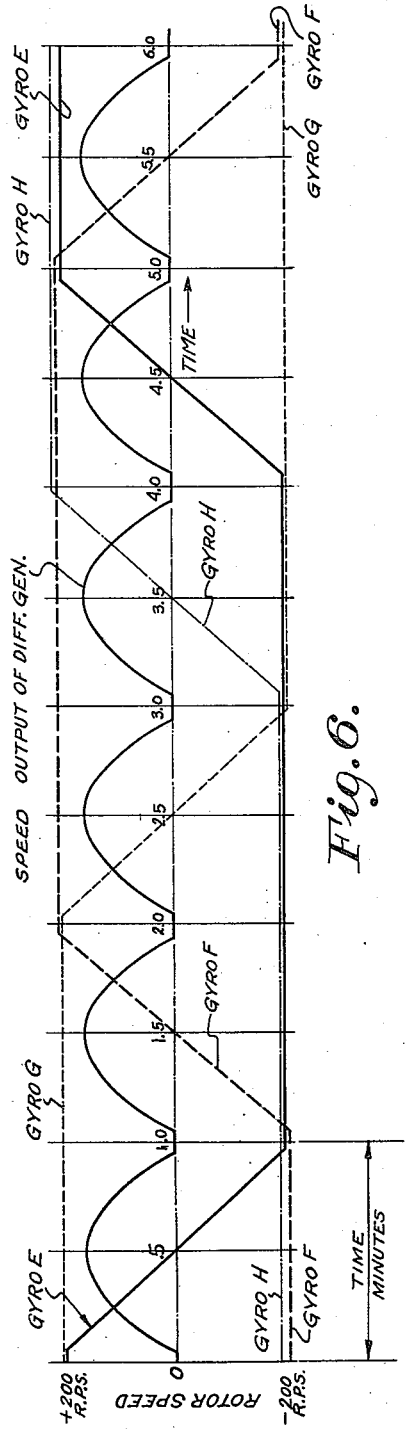
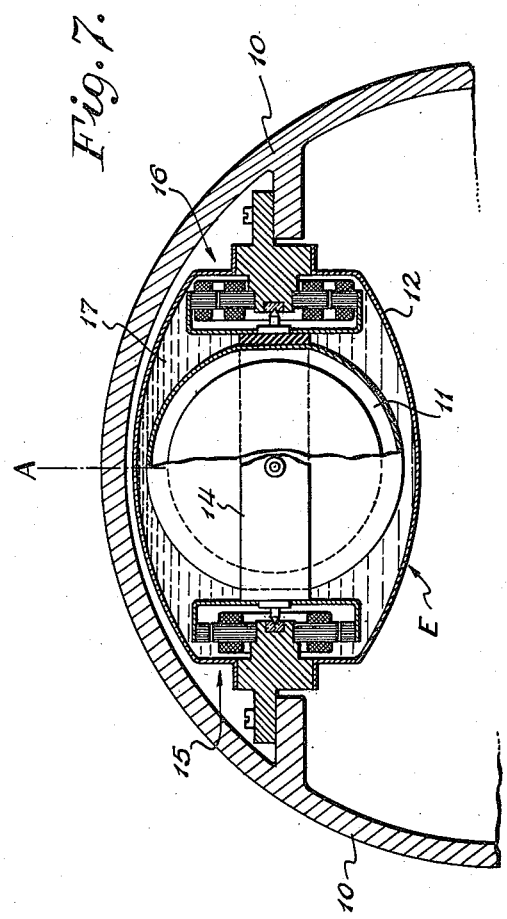
INVENTORS
VICTOR VACQUIER
ROBERT B. BLIZARD
BY
Arthur H. Serrell
ATTORNEY

United States Patent Office 2,835,131
Patented May 20, 1958

2,835,131

NAVIGATING SYSTEMS FOR DIRIGIBLE CRAFT

Victor Vacquier, Garden City, N. Y., and Robert B. Blizard, Stamford, Conn., assignors to Sperry Rand Corporation, a corporation of Delaware Application December 23, 1952, Serial No. 327,547

21 Claims. (Cl. 74—5.37)

The present invention relates generally to an improvement in the art of navigating systems for dirigible craft, either of the piloted or pilotless type. More particularly, the improved system includes four gyroscopes having equiangular tetrahedrally arranged space axes to provide an inertial reference. The vertical reference device of the system is provided by a platform movable about a vertical or azimuth axis having a pair of accelerometers thereon responsive to horizontal accelerations of the craft in respective mutually perpendicular directions. The vertically and inertially referenced system is also one that provides a continuous measure of the latitude and longitude of the craft on which it is employed. The system also is operative to guide the craft along any chosen path while permitting arbitrary or unpredicted changes in the course of the craft to be made during flight. The system requires that the geographic coordinates of the starting point of the craft and the craft's initial heading be known for proper initial adjustment thereof.

One of the objects of the present invention is to obviate the necessity of torquing the gyroscopes of the system to compensate for the drift thereof in accordance with a preflight or continuously computed drift correction.

One of the features of the invention resides in the provision of an inertial reference for a system of the character described in which four gyros are mounted on a frame to detect motion of the frame about space axes corresponding to the sides of an equilateral tetrahedron.

Another of the features of the invention is provided by the described gyroscopic reference in which an operating means is included with the spinning means for each of the gyroscopes so that the directions of spin of the gyroscopes are periodically reversed one at a time.

Still a further feature of the invention resides in the provision of means in the system for reversing the sense of the motion detecting pick-offs of the gyroscopes as the direction of spin of the gyroscopes is reversed.

A further feature of the invention is provided by a means for converting tetrahedral space axis measurements to Cartesian axis measurement to facilitate the operation of the pitch, roll and azimuth follow-up motors of the system.

Another feature of the invention is provided by the vertical reference device of the system.

Figure 1A:
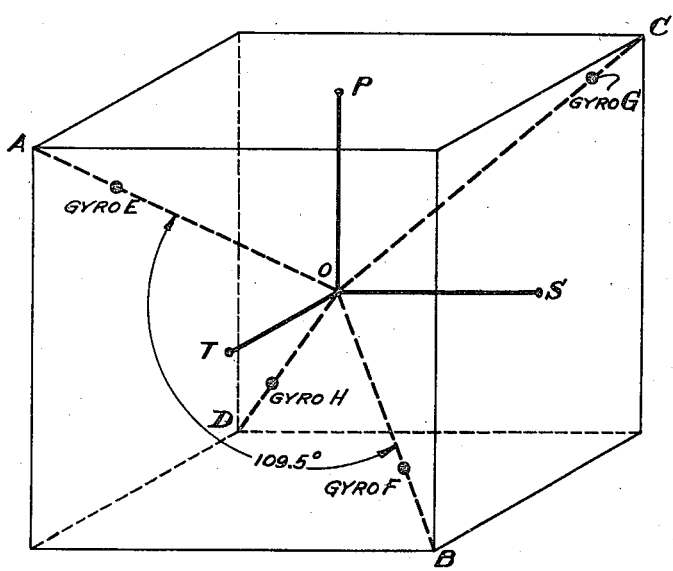
Figure 2:
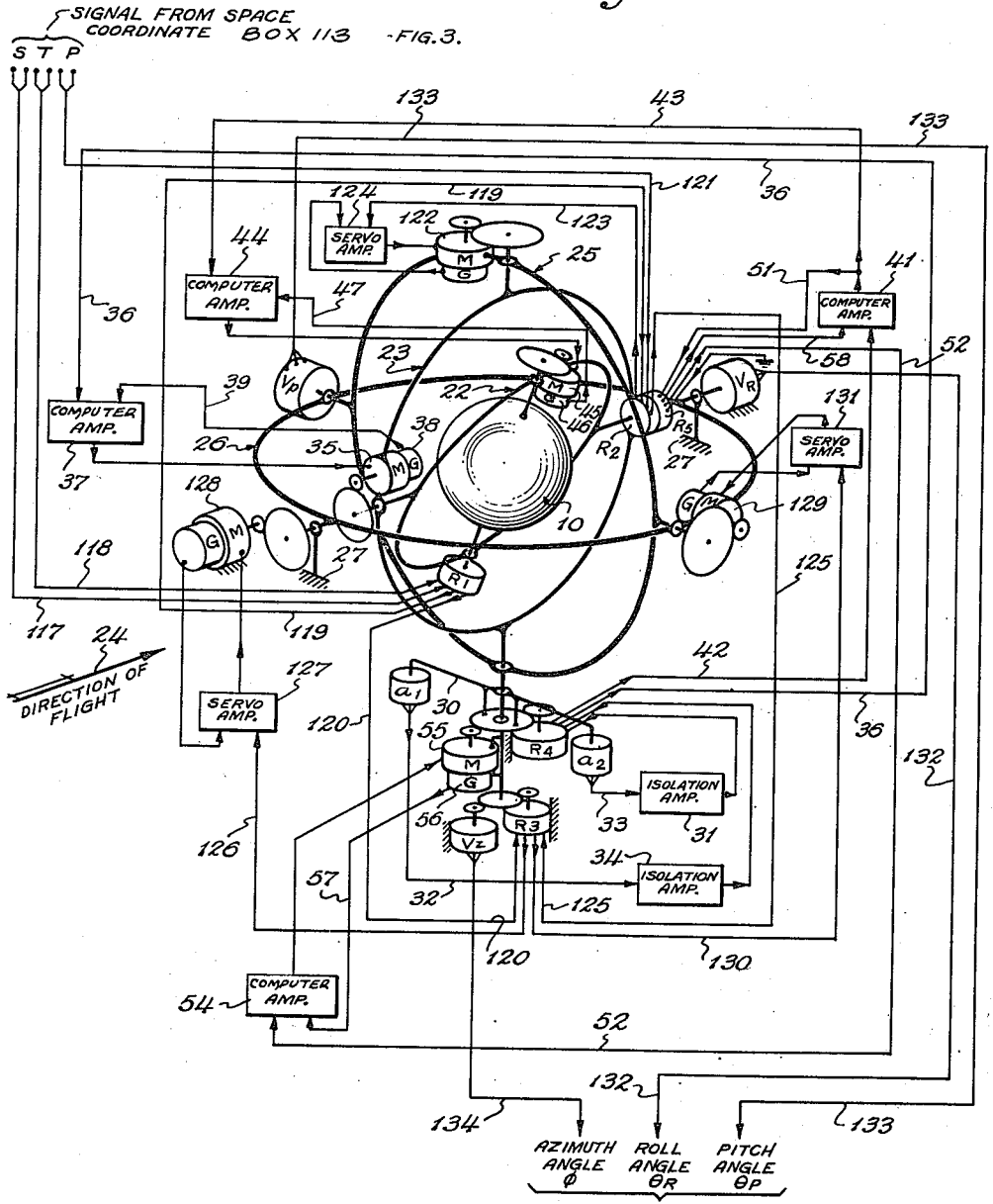
Figure 3:
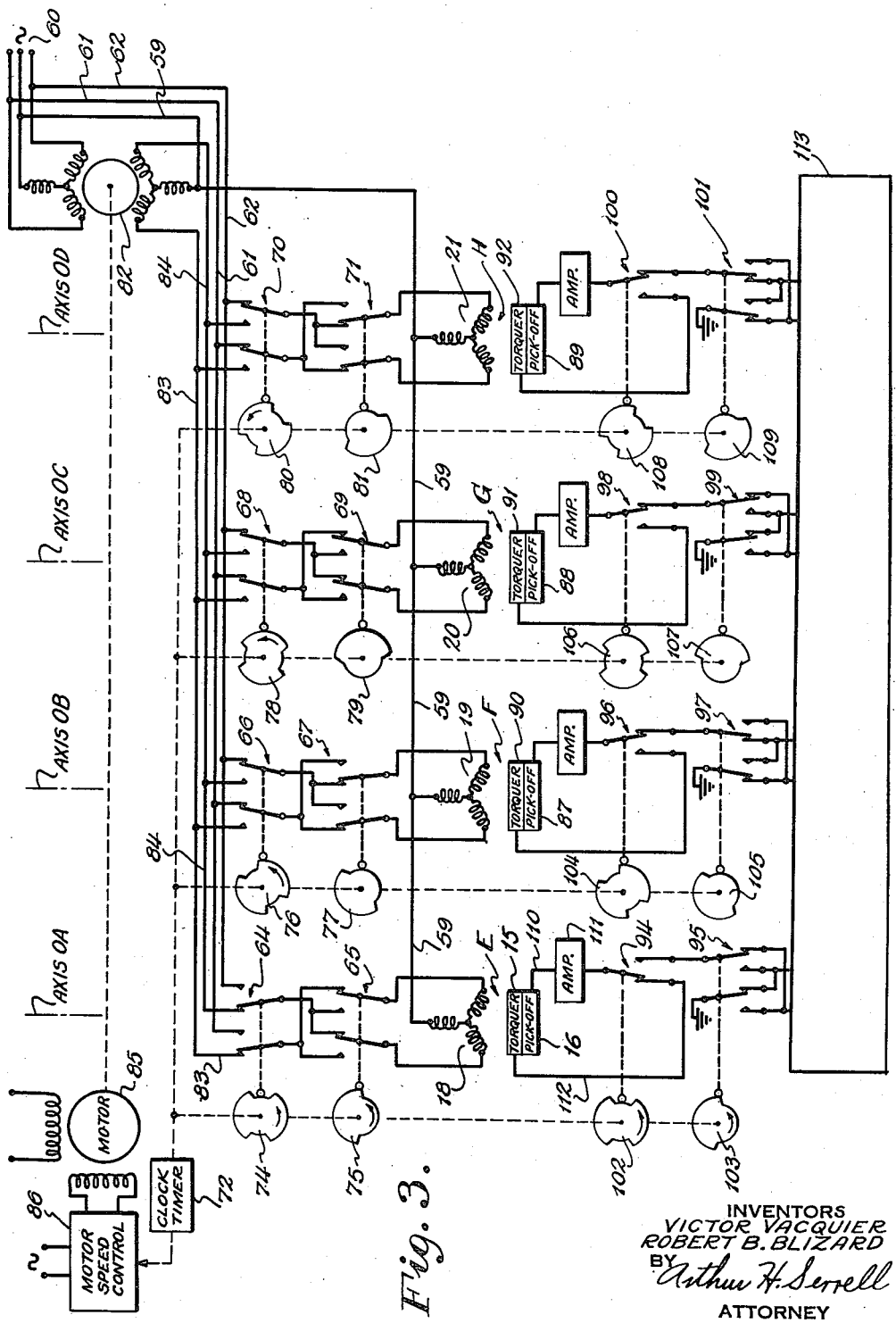
Figure 4:
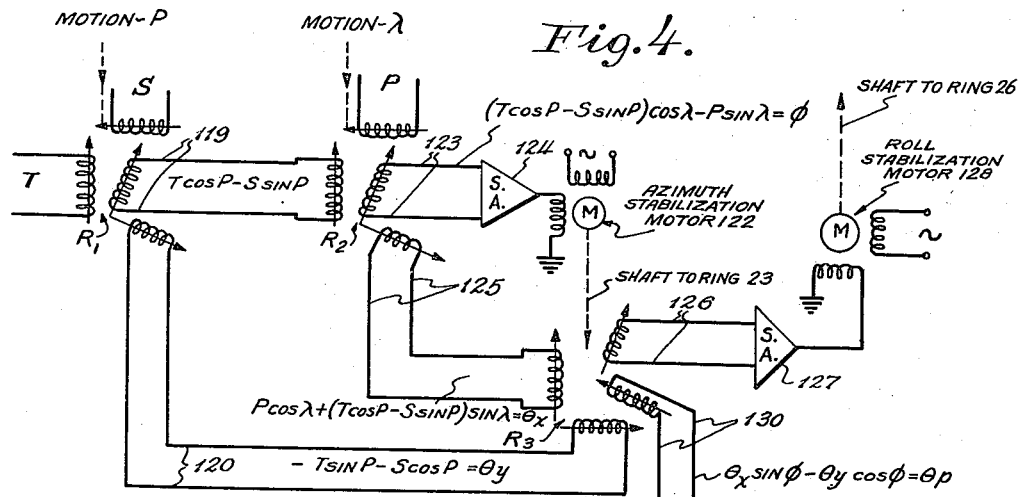
Figure 5:
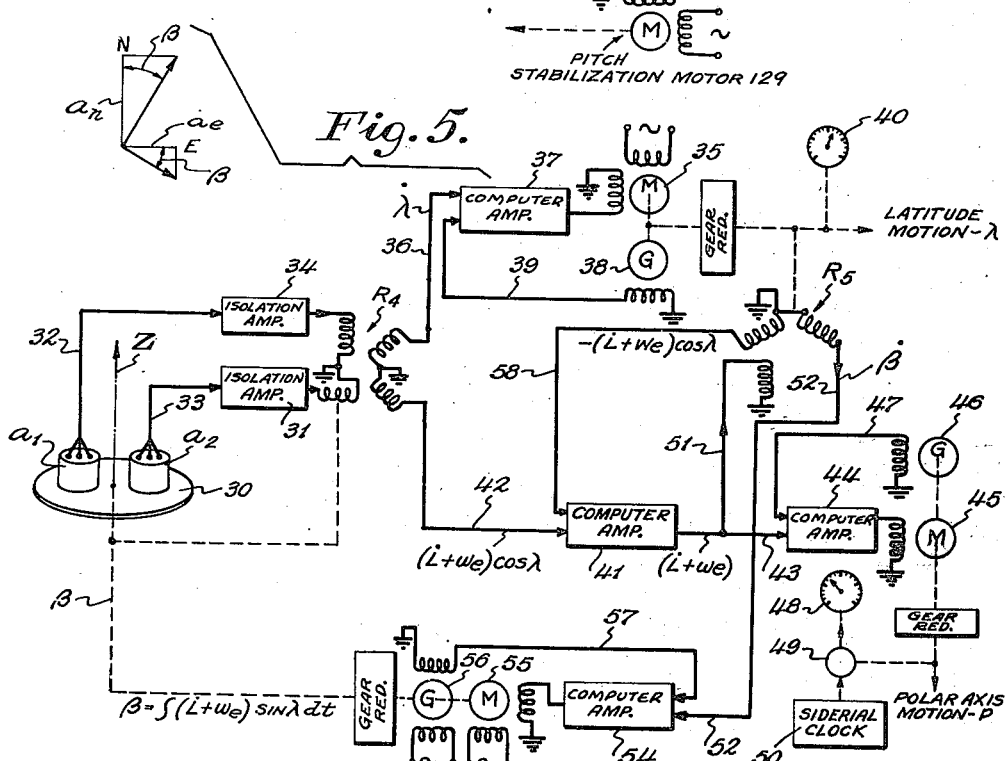

Further objects, features and structural details of the invention will be apparent from the following description when read in relation to the accompanying drawings, wherein, Fig. 1 is a geometric diagram showing a celestial sphere with the Cartesian axes OP, OS and OT of the improved navigating system arranged therein, Fig. 1a is a further geometric diagram showing the spatial relationship between the tetrahedral axes OA, OB, OC, OD and the Cartesian axes OP, OS and OT of the system, Fig. 2 is a perspective schematic view and circuit diagram of a system constructed in accordance with the present inventive concepts, Fig. 3 is a diagrammatic view showing a particular combination of elements with interconnecting circuitry that provides the structural parts of the system including the means for spinning the gyroscopes, the means for reversing the direction of spin of the gyroscopes periodically one at a time, the means for reversing the sense of the measurements of the pick-offs of the gyroscopes as the direction of spin thereof is reversed, and the means for converting the tetrahedral axis measurements to Cartesian axis measurements, Fig. 4 is a view similar to Fig. 3 showing the resolver and follow-up motor elements providing the computed input to the azimuth, pitch and roll Cartesian axes of the system, Fig. 5 is a further view similar to Fig. 3 showing the vertical reference device of the system in connection with the latitude and longitude computers. The view further includes a vector diagram, Fig. 6 shows a plurality of curves showing the sequence of the operations of the gyroscopes of the system in which rotor speed and direction is plotted with relation to time for each of the individual gyroscopes, and Fig. 7 is an enlarged partial section view of the stabilized frame of the system, the view being taken on the tetrahedral space axis OA in Fig. 1, the view showing the preferred arrangement and parts of one of the four gyroscopes of the system in the frame. The gyroscopes effective to measure motions of the frame about the other tetrahedral axes will be understood to be the same as the gyroscope shown in Fig. 7.

With particular reference to Figs. 1, 1a, 2 and 7 of the drawing, the improved system includes a stabilized element depicted in the form of a hollow spherical frame 10. The inertial reference for stabilizing the frame 10 in accordance with the present inventive concepts is provided by four gyroscopes, E, F, G and H mounted on the frame 10 for detecting rotation about space axes, respectively indicated in Fig. 1a by the letters OA, OB, OC, and OD which are the normals to the sides of an equilateral tetrahedron through the geometric center thereof. By definition, the space axes have a common point O and the common angle between the axes is approximately 109.5°. The component parts of gyroscope E of the reference and its relation to frame 10 and space axis OA in particular are shown in Fig. 7. The other gyroscopes F, G and H are arranged in frame 10 relative to the respective tetrahedral axes OB, OC and OD in a manner identical to that shown for gyroscope E relative to axis OA. Accordingly, in order to prevent over complication of the drawings, the specific structure of gyroscopes F, G and H as the same would appear within the frame 10 has not been included in the drawings.

With particular regard to Fig. 7, the illustrated gyroscope E of the four gyroscope reference device provides a measure of the motion of the frame 10 about the space axis OA. As shown, the gyroscope includes a rotor 11 in an evacuated case mounted in a fluid containing receptacle 12 fixed to the frame 10. A pivotally supported ring member 14 formed as part of the case interconnects the rotor 11 and the fixedly mounted receptacle or housing 12. The precession axis of the gyroscope E is the axis defined by the bearings between the ring member 14 and the housing receptacle 12, the axis being normal to the space axis OA. The spin axis of the rotor 11 of the gyroscope E is defined by bearings in the ring member 14 or enclosed case which support the rotor with freedom about an axis normal to the precession axis of the gyroscope. Such spin axis is also normally perpendicular to the space axis OA, it being so represented in Fig. 7.

The gyroscopes, as represented by gyroscope E, also include a conventional type of torque motor 15 effective about the precession axis thereof. The measurements of the respective gyroscopes, as shown in gyroscope E, may be obtained from a selsyn type pick-off 16 whose stator is fixedly mounted within the receptacle housing 12. The rotor of the electrical pick off 16 is fixedly connected to the ring member 14. The damping fluid for the gyroscope E is represented at 17.

In accordance with the present inventive concepts, the frame or sphere 10 together with ring 22, Fig. 2, are stabilizer by the signals of the pick-offs of the gyroscopes about any three of the four spatial axes OA, OB, OC and OD. The two degree of freedom gyroscope for the axis not providing data is disconnected and the direction of spin of its rotor is reversed. When the reversed rotor has reached normal operating speed, the gyroscope is reconnected in the system and another gyroscope disconnected to have its rotor spin direction reversed. This action continues sequentially throughout the operation of the system so that the gyroscopes per se provide a gyroscopic inertial space reference for the frame or stabilized sphere 10 and ring 22. During the rotor reversing period for each of the gyroscopes, the output of its pick-off 16 is connected to the torque motor 15 thereof so that upon reinsertion of the gyroscope in the system there is a null output from the pick-off. No other torques are exerted on the gyroscopes for the purpose of correcting drift due to any cause. The present reference is rendered substantially drift free due to the fact that all of the gyroscopes thereof have their rotor spin directions periodically reversed. The spinning means for the respective gyroscopic rotors may be constituted by conventional electric motors of the induction or synchronous types whose three phase wound stators are indicated in Fig. 3 of the drawing at 18, 19, 20 and 21 for the respective gyroscopes E, F, G and H. The operations of the system do not depend on the particular utilization of the two degree of freedom damped gyroscopes E, F, G and H in the frame 10 as other equivalent devices providing the same controlling output may be employed.

The gimbal mountings for the stabilized inertial frame 10 of the system are particularly illustrated in Fig. 2. As shown in this figure, sphere 10 is mounted on a ring 22 with freedom about a polar axis, represented as axis OP in Fig. 1. The ring 22 is mounted with freedom about an east-west horizontal axis on an azimuth or vertical ring 23. The position of the sphere 10 and ring 22 about the system's east-west axis relative to a horizontal plane represents the latitude of the craft as indicated by the angle λ in Fig. 1. The arrow 24, Fig. 2, depicts an arbitrary flight direction for the craft which the arrangement of parts of the system indicates is approximately east-west. Motions of the sphere about its polar axis OP and east-west axis are obtained as hereinafter described from suitable motors driven by the output of a computer in response to the rotations occasioned by the velocity of the craft relative to the earth and due to the spinning motion of the earth. The azimuth or vertical ring 23 which supports the horizontal latitude ring 22 is a local vertical member that is stabilized in azimuth, roll and pitch by appropriately resolved error signals from the gyroscopes on the inertial sphere 10.

As shown in Fig. 2, the azimuth ring or member 23 is mounted with freedom about a normally vertical and two, mutually perpendicular, normally horizontal axes by means of the universal supporting rings 25 and 26. Ring 26 is supported with freedom relative to the body of the craft represented at 27 with freedom about a normal horizontal axis corresponding to the roll axis of the craft. Ring 25 supported on ring 26 is mounted with freedom about a normal horizontal axis corresponding to the pitch axis of the craft. The earth's Cartesian axes of the system are constituted by the normally vertical axis of ring 23 and the two, mutually perpendicular, normally horizontal axes respectively of the ring 25 and ring 26. The described ring arrangement universally supports the frame or sphere 10 and ring 22 with freedom about three normally mutually perpendicular axes.

One possible set of tetrahedral axes may be formed as illustrated in Fig. 1a by drawing the four diagonals in the cube depicted therein. These four diagonals form the set of tetrahedral axes OA, OB, OC and OD of the system and their intersection O is the origin of the axes. A tetrahedron may be formed by planes passing through the diagonals of the sides of the cube. The diagonals of the cube are normal to the faces of the tetrahedron. The positive sense of each tetrahedral axis is taken in the direction where the cube diagonal intersects a face of the tetrahedron normally.

As shown in Fig. 1a, a set of Cartesian axes OP, OT and OS are placed with their origin coincident with the tetrahedral origin and with the axes parallel with the edges of the cube. In this configuration, each Cartesian axis is in a plane formed by two tetrahedral axes.

The positive sense of each Cartesian axis is as follows:
OP—coplanar with the OA and OC axes and in their resultant direction,
OS—coplanar with the OB and OC axes and in their resultant direction, and
OT—coplanar with the OA and OB axes and in their resultant direction.

The angle between any two tetrahedral axes is $$\cos^{-1}\left(-\frac{1}{3}\right)$$

or approximately 109.5°. The angle each Cartesian axis makes with either of the two tetrahedral axes with which it is coplanar is $\cos^{-1} 1/\sqrt{3}$ or approximately 54.75°.

To transform small rotations from the tetrahedral axes to the Cartesian axes, the sum of the projections of the Cartesian axes on the tetrahedral axes are found. These equations are then solved. Where A, B, C and D represent small rotations about the tetrahedral axes OA, OB, OC and OD, respectively, and P, T and S are resultant small rotations about the Cartesian axes OP, OT and OS, respectively, these relations are as follows:

$$A = \frac{1}{\sqrt{3}}(P - S + T)$$

$$B = \frac{1}{\sqrt{3}}(-P + S + T)$$

$$C = \frac{1}{\sqrt{3}}(P + S - T)$$

$$D = \frac{1}{\sqrt{3}}(-P - S - T)$$

Then $$A + B + C + D = O$$

and $$P = \frac{\sqrt{3}}{2}(A + C) = -\frac{\sqrt{3}}{2}(B + D)$$

$$S = \frac{\sqrt{3}}{2}(B + C) = -\frac{\sqrt{3}}{2}(A + D)$$

$$T = \frac{\sqrt{3}}{2}(A + B) = -\frac{\sqrt{3}}{2}(C + D)$$

The geometrical configuration of Fig. 1a may be located in the celestial sphere of Fig. 1 in the following manner. The plane of the celestial horizon having the central point O therein is designated at 28. The north and east designated at O-north and O-east are perpendicular and lie in the celestial horizon. The zenith axis OZ is mutually perpendicular to O-north and O-east. The plane of the celestial equator includes point O and is designated at 29. The OP axis is perpendicular to the celestial equator and the OS and OT axes are contained in it. The OT axis intersects the celestial equator at the vernal equinox. The meridian plane is defined by OZ and O-north and will include OP and OS. The representation of the respective tetrahedral axes is omitted in Fig. 1 because of difficulty of presentation and possible confusion. The relation between these axes and the Cartesian axes is, however, clearly depicted in Fig. 1a.

The coordinate transformation from tetrahedral to Cartesian axes is obtained by a converting means that is responsive to the error signals of the pick-offs of the gyroscopes E, F, G and H.

Motion about the polar axis OP from a computer is expressed, $$P = \int (\omega_e + \dot{L}) dt$$

where $\omega_e$ is the earth's rate of rotation and $\dot{L}$ is the rate of change of the longitude of the apparatus. L represents longitude. Polar motion P is equal to zero when the meridian crosses the vernal equinox $\gamma$. As shown in Fig. 1, the meridian is represented as displaced from the vernal equinox $\gamma$ by a polar motion P of 90 degrees. In the noted equation, $t$ represents time.

Tilt about the north axis, O-north, Fig. 1, clockwise looking north is expressed, $$\theta_x = P \cos \lambda + \sin \lambda (T \cos P - S \sin P)$$

Tilt about the east axis, O-east, Fig. 1, clockwise looking east is expressed, $$\theta_y = -T \sin P - S \cos P$$

The azimuth angle $\phi$ which is zero on a north heading is expressed, $$\phi = (T \cos P - S \sin P) \cos \lambda - P \sin \lambda$$

Tilt about the fore and aft axis of the craft or the roll angle $\theta_R$ in a clockwise direction and looking forward is expressed, $$\theta_R = \theta_x \cos \phi + \theta_y \sin \phi$$

Tilt about the athwartship axis of the craft or pitch angle positive nose down is expressed, $$\theta_p = \theta_x \sin \phi - \theta_y \cos \phi$$

The expressions for roll, pitch and azimuth errors are derived in terms of the motions about the inertial Cartesian axes OP, OT and OS. Such errors or measurements as represented by the respective terms $\theta_R$, $\theta_p$ and $\phi$ are employed to operate respective follow-up motors of the system to stabilize the frame or sphere 10 and ring 22.

In accordance with the present inventive concepts, the improved system includes a vertical reference device in the form of a pair of integrating accelerometers generally indicated at $a_1$ and $a_2$ that are mounted on a platform 30, as shown in Figs. 2 and 5, which is movable in azimuth to correct the system for the effect thereon of rate of change of longitude of the craft and vertical component of the earth's rate of rotation. The accelerometers employed may be of conventional character, and with appropriate integration constitute an earth's radius pendulum with an 84.4 minute period. The accelerometers are so arranged as to make the platform 30 on which they are carried track the gravity vector. Oscillation of the platform 30 above the gravity vector with a period of 84.4 minutes will occur if the platform is disturbed. Such a device behaves like an earth's radius pendulum whose indication of the vertical (gravity vector) is insensitive to acceleration of the vehicle carrying it over the earth's face. The accelerometers $a_1$ and $a_2$ of our improved system can be of the type shown and described in the copending application of Willis G. Wing for Accelerometers, filed November 25, 1952. (Serial No. 322,403.) As indicated in Fig. 2, the platform 30 with the accelerometers $a_1$ and $a_2$ thereon is rotatably mounted about the axis of the vertical ring or member 23. The accelerometers are mounted on the platform 30 so as to be responsive to horizontal accelerations of the craft in respective mutually perpendicular directions. In the vector diagram forming part of Fig. 5, the initial directions have been arbitrarily chosen as north and east so that at the start accelerometer $a_1$ senses northerly accelerations being designated by the vector $a_n$ and accelerometer $a_2$ senses easterly accelerations being designated by the vector $a_e$. The angle $\beta$ in this figure represents conditions sometime after the start. It is changed at the rate $\dot{\beta} = (\omega_e + \dot{L}) \sin \lambda$ relative to ring 22 so that there is no vertical component of rotation of the accelerometer platform 30 in space at any time. Consequently, it is unnecessary to correct the described vertical reference device for either Coriolis acceleration or the centrifugal force of the earth's rotation.

The computing means for the angles $\beta$, $\lambda$, L and $t$ include a pair of sine-cosine resolvers $R_4$ and $R_5$, three integrating servos, and a sidereal clock, as shown in Figs. 2 and 5. Electrical resolver $R_4$ has rotor windings that are connected by way of suitable gearing to the rotatable platform 30, one of such windings being shown as receiving the output signal of accelerometer $a_2$ through lead 33 and isolation amplifier 31. The other winding receives the output signal of accelerometer $a_1$ through lead 32 and isolation amplifier 34. The signal of accelerometer $a_1$ to the resolver $R_4$ is represented by the expression $\int (a_e \sin \beta + a_n \cos \beta) dt$. The input to resolver $R_4$ from accelerometer $a_2$ fed by way of lead 33 and isolation amplifier 31 is represented by the expression $$\int (a_e \cos \beta - a_n \sin \beta) dt$$

Resolver $R_4$ resolves the first integral of the integrating accelerometer signals with two components respectively in north and east directions in the illustrated arrangement. The northerly component represented by the rate term $\lambda$ is integrated by a latitude motion providing motive means in the form of a motor indicated at 35. As shown, motor 35 is mounted on ring 23 and is connected by suitable gearing to ring 22 to position the same about its east-west axis which is determinative of the latitude $\lambda$ of the craft. Lead 36 feeds the motor 35 by way of computer amplifier 37. Generator 38 driven by the motor 35 provides a speed regulating follow back signal for the motor that is fed to the computer amplifier 37 by way of lead 39. A latitude indicator 40 is shown as directly driven from the output shaft of the motive means 35. The described means derives a measurement of the craft's latitude responsive to the outputs of accelerometers $a_1$ and $a_2$.

The easterly component of the output of the resolver $R_4$ obtained from accelerometers $a_1$ and $a_2$ is utilized by suitable computing means to obtain the longitude angle L, the polar motion angle P and the accelerometer platform azimuth angle $\beta$. As shown in Fig. 5, this easterly speed signal represented by the term $(\dot{L} + \omega_e) \cos \lambda$ is fed by way of lead 42 to a computer amplifier 41 which, by feedback from resolver $R_5$, removes the $\cos \lambda$ factor. The cosine factor in the feedback signal to amplifier 41 is provided by resolver $R_5$. The computer amplifier 41 is a suitable high gain amplifier that operates to make the difference between the input thereto by way of lead 42 and the feedback lead 58 infinitesimal. The amplifier 41 is only able to do this if the output of the same is $$(\dot{L} + \omega_e)$$

The output of the amplifier, $\dot{L} + \omega_e$ is fed by way of lead 43 to a computer amplifier 44 whose output in turn operates the polar axis motion motive means 45. As represented in Fig. 5, motive means or motor 45 is mounted on ring 22 and is connected to turn the frame or sphere 10 about its polar axis OP by way of suitable reduction gearing. Motive means 45 integrates the rate signal fed thereto to provide the polar axis angle which is also expressed as $\int(\omega_e+\dot{L})\,dt$. Generator 46 provides a regulating feedback for the motor 45 which drives the same, the feedback signal being fed to the amplifier 44 by way of lead 47. A longitude indicator 48 for the system is driven by the output of a differential 49, one of whose inputs is derived from the shaft of the polar axis motor 45 and the other of whose inputs is obtained from a sidereal clock mechanism indicated at 50.

The term $\beta$ is derived by a computing means including the resolver $R_5$ which supplies sine and cosine functions of the craft's latitude. As shown in Fig. 2, the rotor of the resolver $R_5$ is positioned in accordance with the position of the ring 22 which is located by the latitude motor 35. In Fig. 5, the rotor of resolver $R_5$ is diagrammatically indicated as directly driven by the output shaft of the motor 35 to provide the latitude term. Lead 51 feeds the input term $(\dot{L}+\omega_e)$ to the resolver $R_5$, the lead being connected to the output lead 43 from computer amplifier 41. The resolver $R_5$ multiplies two of the input terms to provide an output in lead 52. This signal corresponds to the product of the sine of the latitude of the craft and the sum of the earth's rate of rotation and the rate of change of longitude of the craft. Lead 52 provides an input to an integrating computer amplifier 54 which drives motor 55 to position the platform 30 about its vertical axis. The motor 55 is fixed to ring 23 and its output shafting through suitable reduction gearing is connected to the rotatably mounted platform 30. A follow back is also provided for motor 55 in the form of generator 56 whose output is fed to the computer amplifier 54 by way of lead 57. The elements described provide a means for deriving measurements of the craft's latitude, a means for deriving measurements of the craft's longitude, a computing means providing a measurement of the sine of the latitude of the craft and a computing means providing a measurement of the sum of the vertical component of the earth's rotation and the rate of change of longitude of the craft. In operation of the system, the platform 30 is only moved by the motor 55 so that there is no vertical component of rotation of the accelerometers $a_1$ and $a_2$ relative to inertial space, regardless of the heading, pitch or roll condition of the craft. In setting up the system for operation, it is necessary that the platform 30 be level and the ring 23 be vertical. It is not necessary that the accelerometers $a_1$ and $a_2$ be oriented as described, as the noted directions are arbitrary on a non-rotating earth. With the correcting input $\omega_e$ to motor 55, the platform 30 is so controlled that the defined vertical reference device is one that is unaffected by the vertical component of the earth's rotation. Hence, as far as the vertical reference is concerned, the earth may be considered stationary.

In accordance with the present inventive concepts, a means for periodically reversing the directions of spin of the rotors of the respective gyroscopes E, F, G and H one at a time is depicted in Fig. 3 of the drawing. With reference to this figure, the three phase stators 18, 19, 20 and 21 of the gyroscopes represent the respective means for spinning the gyroscopic rotors which may take the form of conventional alternating current induction motors. As shown, the stators have a common connection constituted by lead 59 to a suitable source of alternating current electrical energy indicated at 60. The other input leads 61 and 62 for the spinning motors connect with a pair of two pole, double throw switches 64, 65 for gyroscope E, the first of which operates to connect the stator 18 to the source or to break the connection therebetween, and the second of which functions as a reversing means which determines the direction of spin for the gyroscopic rotor. The corresponding switches for gyroscope F are indicated at 66, 67, for gyroscope G at 68, 69 and for gyroscope H at 70, 71. In the right-hand closed portions of switches 66, 68 and 70 shown in Fig. 3, the gyroscopes F, G and H are connected to leads 62 and 61 and thereby to the energy source 60. Switch 64 is closed, as shown in Fig. 3, in the left-hand position so that the circuit to the source 60 is broken. The rotor of the gyroscope E is consequently in the direction reversing cycle while the rotors for gyroscopes F, G and H are spinning at full speed. As shown, by the like positions of reversing switches 67 and 71, the rotors of gyroscopes F and H are spinning in the same direction. Switch 69 is shown in the opposite position so that the rotor of gyroscope G is spinning in a direction opposite to that of gyroscopes F and H.

The sequence of operations of the switches 64 through 71 is determined by a corresponding number of cam and follower actuators connected to the respective switch arms, the actuators being driven by a clock timer indicated at 72. The clock driven cam elements of the respective actuators are indicated at 74, 75, 76, 77, 78, 79, 80 and 81. The spin direction reversing means shown in Fig. 3 includes a variable speed and frequency differential generator represented at 82. Generator 82 has three phase input windings directly connected to the source of supply 60. The outut windings of the generator connect with common lead 59 and with two of the poles of each of the switches 64, 66, 68 and 70 by way of leads 83 and 84. As shown, generator 82 is driven by a suitable alternating current electric motor 85 whose speed is varied by means of a motor speed control indicated at 86 that is operated by the clock timer 72. In the switching operations of the system as applied to gyroscope E, for instance, switch 64 is operated at zero time, Fig. 6, to disconnect the rotor spinning motor 18 from the line and connect the same to the differential generator 82. The generator 82 under control of regulated motor 85 is accelerated from a standstill condition to approximately synchronous frequency so as to drop the output thereof to zero frequency which occurs as indicated in Fig. 6 at .5 minute. Switch 65 is then actuated to the position in which the contacting arms are shown in Fig. 3 to reverse the control input leads to the spinning motor 18. From time 0.5 minute to 1.0 minute in Fig. 6, the generator 82 under control of the driving motor 85 is decelerated to a standstill condition, the spinning motor accelerating in the reverse direction to reach its approximate operating speed. Switch 64 at time 1 minute, Fig. 6, is then actuated to its right-hand position in which the spinning motor is reconnected with the line source 60 of electrical energy. Gyroscope E is then included in the reference device and gyroscope F has its spin direction reversed in the manner described under control of switches 66 and 67. Gyroscopes G and H are similarly controlled in accordance with the pattern shown in Fig. 6 responsive to the action of the respective switch pairs 68, 69 and 70, 71.

In the described reversing arrangement, the coupling between the input and output of the differential generator is at a maximum at zero speed for drive motor 85. With acceleration of the generator 82, the frequency decreases until the output frequency is zero. This causes the rotor of the gyroscope being controlled to decelerate to zero speed. The motor 85 in the reversing arrangement shown forms part of a common means for decelerating and accelerating the gyroscopic rotor-spinning motors of each of the gyroscopes E, F, G and H from and to a constant running speed.

Like gyroscope E, each of the gyroscopes F, G and H is provided with pick-offs and torquers corresponding to the respective elements 16 and 15 shown in Fig. 7. The pick-offs of gyroscopes F, G and H are respectively indicated at 87, 88, and 89 in Fig. 3. The respective torque motors of the noted gyroscopes are indicated at 90, 91 and 92 in the same figure. The system also includes a means for reversing the sense of the output of the pick-offs for the gyroscopes with each reversal in the direction of spin of the gyroscopic rotors thereof. Such means include a single pole double throw switch 94 and double pole double throw switch 95 for gyroscope E, similar switches 96, 97 for gyroscope F, switches 98, 99 for gyroscope G and switches 100, 101 for gyroscope H. The respective switches, as noted in Fig. 3, are operated by the clock timer 72 by an actuator mechanism in the form of cam and cam follower elements for the individual switches. The cams for switches 94, 95 are designated at 102, 103 the same being on the same drive shaft as the heretofore described cam parts 74, 75. The drive cams for gyroscope F switches 96, 97 are indicated at 104, 105. Cams 106, 107 on the actuator shaft with cams 78, 79 for gyroscope G control the operation of switches 98, 99. Likewise, cams 108, 109 driven by the clock timer control the operation of switches 100 and 101 of gyroscope H. The switches 94, 96, 98 and 100 of the gyroscopic reference device provided by the four gyroscopes E, F, G and H provide means for interconnecting the pick-offs of the individual gyroscopes with its associated torque motor during periods of rotor reversal. In the position of the parts shown in Fig. 3, the switch 94 of gyroscope E is closed in its left-hand position and the pick-off 16 is connected to torquer 15 by way of lead 110, amplifier 111, switch 94, and lead 112. Any disturbance of the gyroscope E resulting from changing the direction of spin of its rotor is obviated by this arrangement which assures that the gyroscope is correctly positioned about its axis OA relative to frame 10 so that when it is reinserted in the line the output of the pick-off is null. Switches 96, 98 and 100 perform in a similar manner for gyroscopes F, G and H in the sequence noted in Fig. 6 as the respective rotor spin directions are changed. As shown in Fig. 3, switches 96, 98 and 100 are situated in a closed right-hand position so that the respective pick-offs 87, 88 and 89 are disconnected from their related torquers and function in a normal manner to provide a measure of the motions of the frame 10 about the respective axes OB, OC and OD under the condition provided in the noted figure.

Switches 95, 97, 99 and 101 provide a means for reversing the sense of the outputs of the respective pick-offs 16, 87, 88 and 89 with each reversal in the direction of spin of the gyroscopic rotors of the respective gyroscopes E, F, G and H. As shown, these switches are controlled by the cams 103, 105, 107 and 109 operated by the clock timer 72. Switch 95 for gyroscope E is illustrated in the correct position to reverse the sense of the output of pick-off 16 after completion of the rotor reversing cycle and restoration of gyroscope E to the line. The described means adjusts the sense of the input to the system from the pick-offs in accordance with the direction of spin of the respective gyroscopic rotors.

The means provided for converting tetrahedral axis measurements to Cartesian axis measurements is shown in Fig. 3 as a box 113. The input signals from the respective pick-offs 16, 87, 88 and 89 of the gyroscopes E, F, G and H are fed through reversing switches 95, 97, 99 and 101 to the box 113 diagrammatically depicting the converting means. The outputs of the box 113 are P, S and T.

Thus with gyroscope E out, we have $$P = -\frac{\sqrt{3}}{2}(B+D)$$

$$S = \frac{\sqrt{3}}{2}(B+C)$$

$$T = -\frac{\sqrt{3}}{2}(C+D)$$

With gyroscope F out, we have $$P = \frac{\sqrt{3}}{2}(A+C)$$

$$S = \frac{\sqrt{3}}{2}(A+D)$$

$$T = -\frac{\sqrt{3}}{2}(C+D)$$

With gyroscope G out, we have $$P = \frac{\sqrt{3}}{2}(B+D)$$

$$S = \frac{\sqrt{3}}{2}(A+D)$$

$$T = \frac{\sqrt{3}}{2}(A+B)$$

With gyroscope H out, we have $$P = \frac{\sqrt{3}}{2}(A+C)$$

$$S = \frac{\sqrt{3}}{2}(B+C)$$

$$T = \frac{\sqrt{3}}{2}(A+B)$$

As shown in Figs. 4 and 2, the stabilization computing means for the system includes three sine-cosine resolvers indicated at $R_1$, $R_2$ and $R_3$. Resolver $R_1$ is situated on ring 22 and its rotor is positioned in accordance with polar motion P by the motor 45. Measurement S is also fed the resolver $R_1$ by way of lead 117. A third input to the resolver $R_1$ is provided by way of lead 118 from measurement T in Fig. 3. Resolver $R_1$ consequently provides a pair of outputs, one of which is fed to resolver $R_2$ by way of leads 119 and the other of which is fed to resolver $R_3$ by way of leads 120. The input to resolver $R_2$ from resolver $R_1$ is represented by the terms $(T \cos P - S \sin P)$ and the input to resolver $R_3$ from resolver $R_1$ is represented by the terms $$-(T \sin P + S \cos P)$$

which is equal to the hereinbefore noted angle $\theta_y$.

Resolver $R_{12}$ is situated on ring 231 and its rotor is positioned in accordance with the lattitude $\lambda$ of the craft by means of motor 35. A third input to resolver $R_2$ is provided by measurement P which is connected thereto by way of lead 121. One of the outputs of resolver $R_2$ is fed to an azimuth stabilization or follow-up motor 122 for the frame 10 and ring 22 by way of leads 123 and servo amplifier 124. As shown, motor 122 is mounted on ring 25 and is connected to drive azimuth ring 23 through suitable reduction gearing. A generator feedback arrangement similar to that provided for motors 35, 45 and 55, Fig. 5, is also shown for motor 122 in Fig. 2. The input to the azimuth motor 122 from resolver $R_2$ is represented by the terms $$(T \cos P - S \sin P) \cos \lambda - P \sin \lambda$$

which is equal to the azimuth $\phi$ as heretofore derived. The other output of resolver $R_2$ is fed to resolver $R_3$ by way of leads 125. This input to resolver $R_3$ is represented by the terms $P \cos \lambda + (T \cos P - S \sin P) \sin \lambda$ which is equal to the heretofore derived angle $\theta_x$.

The third input to the resolver $R_3$ is obtained from the azimuth stabilization motor 122 which through ring 23 positions the rotor of the resolver. One of the outputs of resolver $R_3$ is fed by way of leads 126 and servo amplifier 127 to a roll stabilization or follow-up motor 128. As shown, motor 128 is mounted on the body of the craft and is connected to ring 26 by way of suitable reduction gearing. A generator feedback arrangement, as shown in Fig. 2, is also provided for the motor 128. The output carried by leads 126 is represented by the terms $\theta_x \cos \phi + \theta_y \sin \phi$ which is equal to the roll tilt angle $\theta_R$ as hereinbefore derived. The other output of resolver $R_3$ is fed to a pitch stabilization or follow-up motor 129 by way of leads 130 and servo amplifier 131. Motor 129 is mounted on ring 26 and drivably connected to ring 25 through suitable reduction gearing. As shown in Fig. 2, motor 129 is also provided with a feedback arrangement similar to that used for the motors 122 and 128. The output of resolver $R_3$ carried by the leads 130 to the pitch follow-up or stabilization motor 129 is represented by the terms $\theta_x \sin \phi - \theta_y \cos \phi$ which is equal to the pitch tilt angle $\theta_p$ as hereinbefore derived.

The system provides a reference facilitating navigation of the craft in space relative to a normally vertical and two mutually perpendicular, normally horizontal Cartesian axes as provided by azimuth ring 23, pitch ring 25 and roll ring 26. As shown in Fig. 2, the system includes roll axis pick-off $V_R$, pitch axis pick-off $V_p$ and azimuth axis pick-off $V_z$ which through the respective leads 132, 133 and 134 provide data corresponding to the roll angle $\theta_R$, pitch angle $\theta_p$ and azimuth angle $\phi$ for employment in suitable utilization apparatus for the craft. Such utilization apparatus may be an automatic pilot in which the pick-off $V_z$ operates to control the rudder of the craft, the pick-off $V_p$ operates to control the elevators of the craft and the pick-off $V_R$ operates to control the ailerons of the craft.

In operation, the respective motive means 122, 128 and 129 controlled by the servo amplifiers 124, 128 and 131 are effective about their respective Cartesian axes through the rings 26, 25, and 23 to stabilize the frame or sphere 10 and ring 22 in accordance with the measurements provided therefor by the computing means as established by the described gyroscopic reference device. The Cartesian axis information is derived from a combination of the axial data provided as hereinbefore described by any three of the four tetrahedral axes of the system, such information being available in the system at all times. The vertical reference included in the system operates through the respective motors 35, 45 and 55 as controlled by the respective computer amplifiers 37, 44 and 54 to position the ring 22, frame 10 and platform 30. The action of the frame is that of a follow-up element whose position in space remains fixed under control of both the provided gyroscopic reference and vertical reference regardless of the maneuvers of the craft on which the system is used. In setting up the system, it is necessary to know the geographic coordinates of the starting point of the craft and its initial heading. After proper setting of the parts in accordance with these factors and the platform 30 level, the system thereafter operates entirely automatically during the flight of the craft. The improved system does not utilize precomputed flight data to control or torque the gyroscopes so that while the system is capable of guiding the craft or vehicle along any chosen flight path, it also permits arbitrary changes in course or maneuvers of the craft to be made as desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a navigating system for dirigible craft, a frame mounted with freedom about a normally vertical and two, mutually perpendicular, normally horizontal Cartesian axes, four gyroscopes mounted on said frame for detecting rotation of the frame about equiangular tetrahedrally arranged space axes, a pick-off between the frame and each of the gyroscopes for measuring the rotations of the frame about the respective space axes, means responsive to said pick-offs for converting tetrahedral axis measurements to Cartesian axis measurements, and motive means for stabilizing said frame operable about each of the Cartesian axes of the frame responsive to the output of said converting means.

2. In a navigating system for dirigible craft, a frame mounted with freedom about a normally vertical and two, mutually perpendicular, normally horizontal Cartesian axes, four gyroscopes mounted on said frame for detecting motion of the frame about equiangular tetrahedrally arranged space axes, motive means for spinning the rotor of each of said gyroscopes, means for operating said rotor spinning motive means including means for periodically reversing the direction of spin of the rotors of the respective gyroscopes one at a time, a pick-off between the frame and each of the gyroscopes for measuring the motions of the frame about the respective space axes, means for reversing the sense of the measurement of the pick-offs as the direction of spin of the rotors of the respective gyroscopes is reversed, means responsive to said pick-offs for converting tetrahedral axis measurements to Cartesian axis measurements, and motive means for stabilizing said frame operable about each of the Cartesian axes of the frame responsive to the output of said converting means.

3. The combination in a gyroscopic stabilization system of, a frame having freedom about three normally mutually perpendicular Cartesian axes, four gyroscopes mounted on said frame for detecting motion of the frame about equiangular tetrahedrally arranged space axes, a pick-off between the frame and each of the gyroscopes for measuring the motions of the frame about the respective space axes, means responsive to said pick-offs for converting tetrahedral axis measurements to Cartesian axis measurements, and motive means for each of said Cartesian axes operatively connected to said frame responsive to the output of said converting means.

4. The combination in a gyroscopic stabilization system of, a universally supported frame, four gyroscopes mounted on said frame for detecting motion of the frame about equiangular tetrahedrally arranged space axes, motive means for spinning the rotor of each of the gyroscopes, and means for operating said rotor spinning motive means including means for periodically reversing the direction of spin of the rotors of the respective gyroscopes one at a time.

5. The combination in a gyroscopic stabilization system of, a frame having freedom about three normally mutually perpendicular Cartesian axes, four gyroscopes mounted on said frame for detecting motion of the frame about equiangular tetrahedrally arranged space axes, motive means for spinning the rotor of each of the gyroscopes, means for operating said spinning motive means including means for periodically reversing the direction of spin of the rotors of said gyroscopes one at a time, a pick-off between the frame and each of the gyroscopes for measuring motions of the frame about the respective space axes, means for reversing the sense of the measurement of the pick-offs as the direction of spin of the rotors of the gyroscopes is reversed, means responsive to said pick-offs for converting tetrahedral axes measurements to Cartesian axis measurements, and motive means for each of said Cartesian axes operatively connected to said frame responsive to the output of said converting means.

6. In a navigating system for dirigible craft having a gyro stabilized member mounted with freedom about a normally vertical and two, mutually perpendicular, normally horizontal axes; a vertical reference device for the system including a platform rotatable about the vertical axis of the gyro stabilized member, a pair of accelerometers mounted on said platform responsive to horizontal accelerations of the craft in respective mutually perpendicular directions, computing means responsive to said accelerometers for measuring the latitude, the vertical component of the earth's rotation and the rate of change of longitude of the craft, and motive means driven by the measurements of said computing means operable to position said platform about its axis.

7. The combination of a mobile member stabilized about a normally vertical and two, mutually perpendicular, normally horizontal axes; and a vertical reference device including a platform rotatable about the vertical axis of the member, a pair of accelerometers mounted on said platform responsive to horizontal accelerations of the stabilized member in respective mutually perpendicular directions, means operated by said accelerometers for providing a signal in accordance with the product of the sine of the latitude of the member and the sum of the vertical component of the earth's rotation and the rate of change of longitude of the member, and motive means driven by said signal providing means operable to position said platform about its axis.

8. A navigating system for dirigible craft comprising a frame mounted with freedom about a normally vertical and two, mutually perpendicular, normally horizontal Cartesian axes, four gyroscopes mounted on said frame for detecting motion of the frame about equiangular tetrahedrally arranged space axes, a pick-off between the frame and each of the gyroscopes for measuring the motions of the frame about the respective space axes, means responsive to said pick-offs for converting tetrahedral axis measurements to Cartesian axis measurements, a platform rotatable about the vertical axis of said frame, a pair of accelerometers mounted on said platform responsive to horizontal accelerations of the craft in respective mutually perpendicular directions, means operated by said accelerometers for positioning said platform about its axis in accordance with the product of the sine of the latitude of the craft and the sum of the vertical component of the earth's rotation and the rate of change of longitude of the craft, means for combining measurements of earth's rate, longitude and latitude with the output of said converting means, and motive means for stabilizing said frame operable about each of the Cartesian axes of the frame responsive to the output of said combining means.

9. A gyroscopic reference device having a frame, four gyroscopes mounted on said frame having equiangular tetrahedrally arranged space axes, motive means for spinning the rotor of each of said gyroscopes, and means for operating the motive means of the gyroscopes including means for periodically reversing the direction of spin of the rotors of the respective gyroscopes one at a time.

10. A gyroscopic reference device having a universally supported frame, four gyroscopes mounted on said frame having equiangular tetrahedrally arranged space axes, precession axes and spin axes, the precession and spin axes of the respective gyroscopes being normally perpendicular to their related space axes, motive means for spinning the rotor of each of said gyroscopes, and means for operating the motive means of the gyroscopes including means for periodically reversing the direction of spin of the rotors of the respective gyroscopes one at a time.

11. The combination in a gyroscopic reference device of a frame, a gyroscope mounted on said frame having precession and spin axes, a pick-off for detecting relative movements of the frame and gyroscope, motive means for exerting a torque about the precession axis, motive means for spinning the rotor of the gyroscope, means for operating the spinning motive means to periodically reverse the direction of spin of the rotor of the gyroscope, and means responsive to said operating means during periods of reversal in the direction of spin of the rotor of the gyroscope for interconnecting said pick-off and torque exerting means.

12. The combination in a gyroscopic reference of, a universally supported frame, four gyroscopes mounted on said frame for detecting motion about equiangular tetrahedrally arranged space axes, precession axes, and spin axes, motive means for each of the gyroscopes for exerting a torque about the precession axes thereof, a pick-off for each of the gyroscopes for detecting relative movements of the frame and gyroscopes, motive means for spinning the rotor of each of the gyroscopes, means for operating the spinning motive means of the gyroscopes including means for periodically reversing the direction of spin of the rotors of the respective gyroscopes one at a time, and means responsive to said operating means during periods of reversal in the direction of spin of the rotors of the gyroscopes for interconnecting the associated pick-off and torque exerting motive means for the respective gyroscopes.

13. The combination in a gyroscopic reference device of, a frame mounted with freedom about a normally vertical axis and two, mutually perpendicular, normally horizontal Cartesian axes, four gyroscopes mounted on said frame for detecting rotation of the frame about equiangular tetrahedrally arranged space axes, a pick-off between the frame and each of the gyroscopes for measuring the rotations of the frame about the respective space axes, means responsive to said pick-offs for converting tetrahedral axis measurements to Cartesian axis measurements, a follow-up motor operable to stabilize the frame about its vertical axis responsive to the output of said converting means, a follow-up motor operable to stabilize the frame about one of its horizontal axes responsive to the output of said converting means, and a follow-up motor operable to stabilize the frame about the other of its horizontal axes responsive to the output of said converting means.

14. The combination of a frame, a gyroscope mounted on said frame, a motor for spinning the rotor of said gyroscope, a pick-off having a part on the gyroscope and a part on the frame, means for operating said spinning motor to periodically reverse the direction of spin of the rotor of the gyroscope, and means responsive to said operating means for reversing the sense of the output of said pick-off with each reversal in the direction of spin of the rotor of the gyroscope.

15. The combination of, a gyroscope, an electric motor for spinning the rotor of said gyroscope, means for operating said spinning motor to periodically reverse the direction of spin of the rotor of the gyroscope including a variable speed and frequency differential generator, timing means operable to connect said generator and spinning motor, and means responsive to said timing means for accelerating said generator to brake said gyroscope rotor spinning motor.

16. In a navigating system for dirigible craft, a frame having an azimuth axis, an east-west axis, and a polar axis, a platform rotatable about the azimuth axis of the frame, a pair of accelerometers mounted on said platform responsive to horizontal accelerations of the craft in respective mutually perpendicular directions, means operated by said accelerometers for positioning said platform about its azimuth axis in accordance with the product of the sine of the latitude of the craft and the sum of the vertical component of the earth's rotation and the rate of change of longitude of the craft, means for resolving the outputs of said accelerometers into northerly and easterly components, means operated by the northerly component of said resolving means for moving said frame about its east-west axis in accordance with a measurement of the latitude of the craft, and means operated by the easterly component of said resolving means for moving said frame about its polar axis in accordance with a measurement of the rate of change of longitude of the craft and the vertical component of the earth's rotation.

17. A navigating system for dirigible craft including a frame having roll, pitch, azimuth, east-west and polar axes, motive means for each of said axes operatively connected to the frame, a platform rotatable about the azimuth axis of the frame, a pair of accelerometers mounted on said platform responsive to horizontal accelerations of the craft in respective mutually perpendicular directions, means for resolving the outputs of said accelerometers into northerly and easterly components, computing means responsive to the northerly component of said resolving means for measuring the latitude of the craft, computing means responsive to the easterly component of said resolving means for measuring the longitude of the craft and the vertical component of the earth's rotation, four gyroscopes mounted on said frame for detecting rotation of the frame about equiangular tetrahedrally arranged space axes, a pick-off between the frame and each of the gyroscopes for measuring the rotations of the frame about the respective space axes, means responsive to said pick-offs for converting tetrahedral axis measurements to Cartesian axis measurements, output means for combining the measurements of said converting means and the measurements of said two computing means, means for operating the roll motive means, pitch motive means and azimuth motive means by the outputs of said combining means, means for operating said east-west axis motive means by the measurement of said latitude computing means, and means for operating said polar axis motive means by the measurement of said longitude and earth's rotation computing means.

18. A system as claimed in claim 17, including motive means for positioning said platform about its azimuth axis, and means responsive to said accelerometers for operating said platform positioning means in accordance with the product of the sine of the latitude of the craft and the sum of the vertical component of the earth's rotation and the rate of change of longitude of the craft.

19. A gyroscopic reference device having a frame, a plurality of gyroscopes mounted on said frame having equiangularly arranged precession axes, motive means for spinning the rotor of each of said gyroscopes, and means for operating said spinning means to periodically reverse the direction of spin of the rotors of the gyroscopes one at a time.

20. In a navigating system for dirigible craft, a frame having an azimuth axis and an east-west axis, means for providing a vertical reference for said frame including a platform mounted on the frame for rotation about the azimuth axis thereof, a pair of accelerometers mounted on said platform responsive to horizontal accelerations of the craft in respective mutually perpendicular directions, means operated by said accelerometers for positioning said platform about its azimuth axis in accordance with the product of the sine of the latitude of the craft, and the sum of the vertical component of the earth's rotation and the rate of change of longitude of the craft, a resolver for the outputs of said accelerometers having a northerly component, and means operated by the northerly component of said resolver for moving said frame about its east-west axis in accordance with a measurement of the latitude of the craft.

21. In a navigating system for dirigible craft, a frame having an azimuth axis and a polar axis, means for providing a vertical reference for said frame including a platform mounted on the frame for rotation about the azimuth axis thereof, a pair of accelerometers mounted on said platform responsive to horizontal accelerations of the craft in respective mutually perpendicular directions, means operated by said accelerometers for positioning said platform about its azimuth axis in accordance with the product of the sine of the latitude of the craft and the sum of the vertical component of the earth's rotation and the rate of change of longitude of the craft, a resolver for the output of said accelerometers having an easterly component, and means operated by the easterly component of said resolver for moving said frame about its polar axis in accordance with a measurement of the rate of change of longitude of the craft and the vertical component of the earth's rotation.

References Cited in the file of this patent

UNITED STATES PATENTS

| | | |
|---|---|---|
| 1,969,965 | Chessin | Aug. 14, 1934 |
| 2,109,283 | Boykow | Feb. 22, 1938 |
| 2,414,291 | Evans | Jan. 14, 1947 |
| 2,566,305 | Beacom | Sept. 4, 1951 |
| 2,577,313 | Downing | Dec. 4, 1951 |
| 2,729,107 | Braddon | Jan. 3, 1956 |

FOREIGN PATENTS

| | | |
|---|---|---|
| 530,260 | Germany | July 28, 1931 |
| 654,658 | Great Britain | June 27, 1951 |

UNITED STATES PATENT OFFICE

Certificate of Correction

Patent No. 2,835,131                                                                    May 20, 1958

Victor Vacquier et al.

It is hereby certified that error appears in the printed specification of the above numbered patent requiring correction and that the said Letters Patent should read as corrected below.

Column 3, line 14, for "stabilizer" read —stabilized—; column 6, line 40, for "λ" read —$\lambda$—; column 10, line 49, for "$R_{12}$" read —$R_2$—; same line, for "231" read —23—.

Signed and sealed this 26th day of May 1959.

[SEAL]

Attest:
KARL H. AXLINE,
*Attesting Officer.*

ROBERT C. WATSON,
*Commissioner of Patents.*